United States Patent
Kim

(10) Patent No.: US 10,880,786 B2
(45) Date of Patent: Dec. 29, 2020

(54) METHOD FOR TERMINAL PERFORMING CELL RESELECTION PROCEDURE, AND DEVICE SUPPORTING SAME

(71) Applicant: LG ELECTRONICS INC., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/349,059

(22) PCT Filed: Nov. 10, 2017

(86) PCT No.: PCT/KR2017/012725
§ 371 (c)(1),
(2) Date: May 10, 2019

(87) PCT Pub. No.: WO2018/088837
PCT Pub. Date: May 17, 2018

(65) Prior Publication Data
US 2019/0289504 A1    Sep. 19, 2019

Related U.S. Application Data

(60) Provisional application No. 62/421,975, filed on Nov. 14, 2016, provisional application No. 62/420,672, filed on Nov. 11, 2016.

(51) Int. Cl.
*H04W 36/00* (2009.01)
*H04W 36/30* (2009.01)
*H04W 4/06* (2009.01)

(52) U.S. Cl.
CPC ......... *H04W 36/0007* (2018.08); *H04W 4/06* (2013.01); *H04W 36/00* (2013.01); *H04W 36/0085* (2018.08); *H04W 36/30* (2013.01)

(58) Field of Classification Search
CPC . H04W 36/0007; H04W 36/30; H04W 36/00; H04W 4/06; H04W 36/0085;
(Continued)

(56) References Cited

U.S. PATENT DOCUMENTS 9,609,527 B1 * 3/2017 Tailor .................... H04B 7/024
10,326,546 B2 * 6/2019 El Ayach .......... H04W 72/0446
(Continued)

FOREIGN PATENT DOCUMENTS

KR    20160079043    7/2016
WO    WO2016108503   7/2016
(Continued)

OTHER PUBLICATIONS

Rohde&Schwarz, "Narrowband Internet of Things: Whitepaper," 1MA266, dated Aug. 8, 2016, 44 pages.

*Primary Examiner* — Sharad Rampuria
(74) *Attorney, Agent, or Firm* — Fish & Richardson P.C.

(57) ABSTRACT

Disclosed are a method for a terminal not supporting frequency priority-based cell reselection performing a cell reselection procedure in a wireless communication system, and a device supporting same. The method comprises the steps of: determining whether an MBMS service of interest is being provided on a serving cell by a neighboring cell; when it is determined that the MBMS service of interest is being provided by the neighboring cell, measuring the quality of a frequency of interest on which the MBMS service of interest is being provided; and performing a cell reselection procedure for the neighboring cell on the basis of the measured quality.

16 Claims, 10 Drawing Sheets

(58) Field of Classification Search
CPC ............. H04W 48/12; H04W 36/0061; H04W 36/0005; H04W 36/0009; H04W 36/0016; H04W 36/03; H04B 7/18541; H04L 47/767

See application file for complete search history.

(56) References Cited

U.S. PATENT DOCUMENTS

| | | | |
|---|---|---|---|
| 10,560,139 B2* | 2/2020 | Brunel | ................. H04B 1/0064 |
| 2019/0261139 A1* | 8/2019 | Fujishiro | ................. H04L 12/18 |

FOREIGN PATENT DOCUMENTS

| | | |
|---|---|---|
| WO | WO2016137642 | 9/2016 |
| WO | WO2016163837 | 10/2016 |

* cited by examiner

METHOD FOR TERMINAL PERFORMING CELL RESELECTION PROCEDURE, AND DEVICE SUPPORTING SAME

CROSS-REFERENCE TO RELATED APPLICATIONS

This application is the National Stage filing under 35 U.S.C. 371 of International Application No. PCT/KR2017/012725, filed on Nov. 10, 2017, which claims the benefit of U.S. Provisional Applications No. 62/420,672 filed on Nov. 11, 2016, and No. 62/421,975 filed on Nov. 14, 2016, the contents of which are all hereby incorporated by reference herein in their entirety.

BACKGROUND OF THE INVENTION

Field of the Invention

The present invention relates to a method of performing, by an NB-IoT terminal or a terminal within an extended coverage, a cell reselection.

Related Art

The 3rd Generation Partnership Project (3GPP) long term evolution (LTE), an enhancement of Universal Mobile Telecommunications System (UMTS), is being introduced in 3GPP release 8. 3GPP LTE uses orthogonal frequency division multiple access (OFDMA) in the downlink and uses single carrier-frequency division multiple access (SC-FDMA) in the uplink. MIMO (multiple input multiple output) with up to four antennas is adopted. Recently, 3GPP LTE-A (LTE-Advanced), an evolution of 3GPP LTE, is under discussion.

3GPP LTE is a technology for enabling high-speed packet communication. Many approaches have been proposed to reduce costs for LTE target users and service providers, improve service quality, expand coverage, and increase system capacity. 3GPP LTE requires cost savings per bit, improved serviceability, flexible use of frequency bands, simple structure, open interface and adequate power consumption of the terminal as a high level requirement.

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

On the other hand, recently, Internet of Things (IoT) communication has attracted attention. IoT refers to communications that do not involve human interaction. The issue about accommodating such IoT communications in a cellular-based LTE system is started to be discussed. However, since the existing LTE system has been designed for the purpose of supporting high-speed data communication, it has been regarded as an expensive communication method.

However, IoT communication can be widely used when it is cheap because of its characteristics. IoT devices were able to reduce costs by simplifying operation by eliminating many functions supported by LTE systems. However, a number of issues are emerging due to the elimination of many functions in IoT devices.

SUMMARY OF THE INVENTION

An NB-IoT terminal or a terminal within an extended coverage does not have frequency priority information for performing cell reselection. That is, the terminal cannot perform the cell reselection procedure based on the frequency priority. Such a terminal does not perform inter/intra-frequency measurements when the serving cell quality is above a threshold value, and thus cannot reselect an SC-PTM cell on inter/intra-frequency.

Therefore, even if the serving cell quality is equal to or higher than the threshold value, the NB-IoT terminal or the terminal within the extended coverage needs to perform inter/intra-frequency measurement on neighboring frequencies which provide the interested MBMS service through MBSFN transmission or SC-PTM transmission if it is interested in receiving the MBMS service.

According to an embodiment of the present invention, there is provided a method for performing, by a terminal not supporting a frequency priority-based cell reselection, a cell reselection procedure in wireless communication system, the method including: determining, on a serving cell, whether an MBMS service of interest is being provided by a neighboring cell; measuring a quality of a frequency of interest on which the MBMS service of interest is being provided if it is determined that the MBMS service of interest is being provided by the neighboring cell; and performing a cell reselection procedure for the neighboring cell based on the measured quality.

The terminal may be a narrowband-internet of things (NB-IoT) terminal or a terminal existing in an extended coverage (EC).

The serving cell may have a quality equal to or greater than a predetermined threshold value.

The frequency of interest may be an intra-frequency having a central frequency that is equal to that of a cell on which the terminal stays or an inter-frequency having a central frequency that is different from that of the cell on which the terminal stays.

The determining may include receiving information on the neighboring cell by which the MBMS service of interest is provided through a system information block 15 (SIB 15).

The determining may include receiving information on the neighboring cell by which the MBMS service of interest is provided through a single-cell multicast control channel (SC-MCCH).

The method may further include receiving the MBMS service of interest from the frequency of interest through a SC-PTM transmission or an MBSFN transmission after performing the cell reselection procedure.

According to another embodiment of the present invention, there is provided a terminal which performs a cell reselection procedures and does not support a frequency priority-based cell reselection in a wireless communication system, the terminal including: a memory; transceiver; and a processor configured to connect the memory to the transceiver, wherein the processor is configured to: determine whether an MBMS service of interest is being provided on a serving cell by a neighboring cell; measure a quality of a frequency of interest on which the MBMS service of interest is being provided if it is determined that the MBMS service of interest is being provided by the neighboring cell; and perform a cell reselection procedure for the neighboring cell based on the measured quality.

The terminal may be a narrowband-internet of things (NB-IoT) terminal or a terminal existing in an extended coverage (EC).

The serving cell may have a quality equal to or greater than a predetermined threshold value.

The frequency of interest may be an intra-frequency having a central frequency that is equal to that of a cell on which the terminal stays or an inter-frequency having a central frequency that is different from that of the cell on which the terminal stays.

The processor may be configured to receive information on the neighboring cell by which the MBMS service of interest is provided through a system information block 15 (SIB 15).

The processor may be configured to receive information on the neighboring cell by which the MBMS service of interest is provided through a single-cell multicast control channel (SC-MCCH).

The processor may be configured to receive the MBMS service of interest from the frequency of interest through a SC-PTM transmission or an MBSFN transmission after performing the cell reselection procedure.

When the predetermined condition is satisfied, the NB-IoT terminal can easily receive the MBMS service of interest by performing a cell reselection procedure for a specific frequency.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
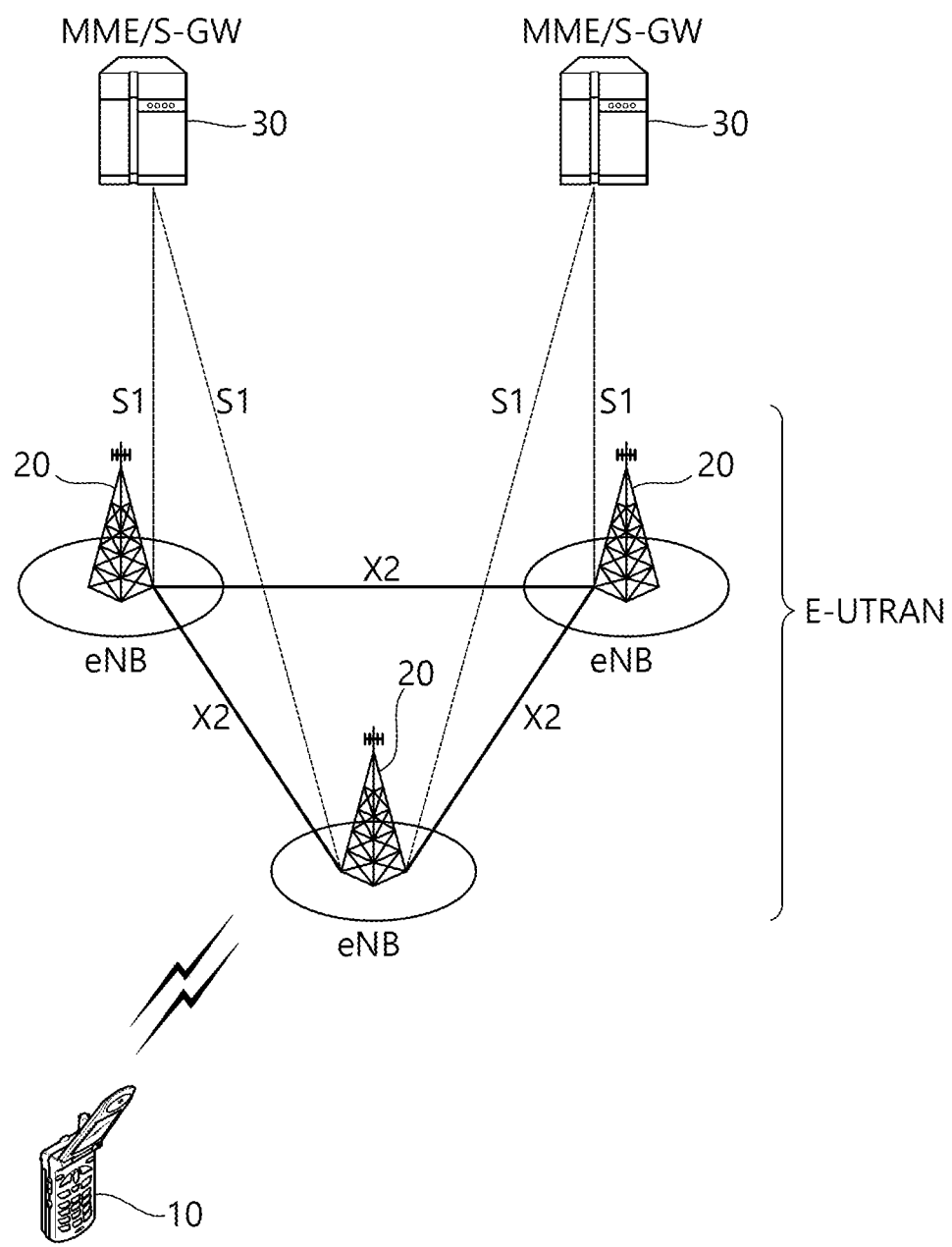
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN, and connected to external network.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
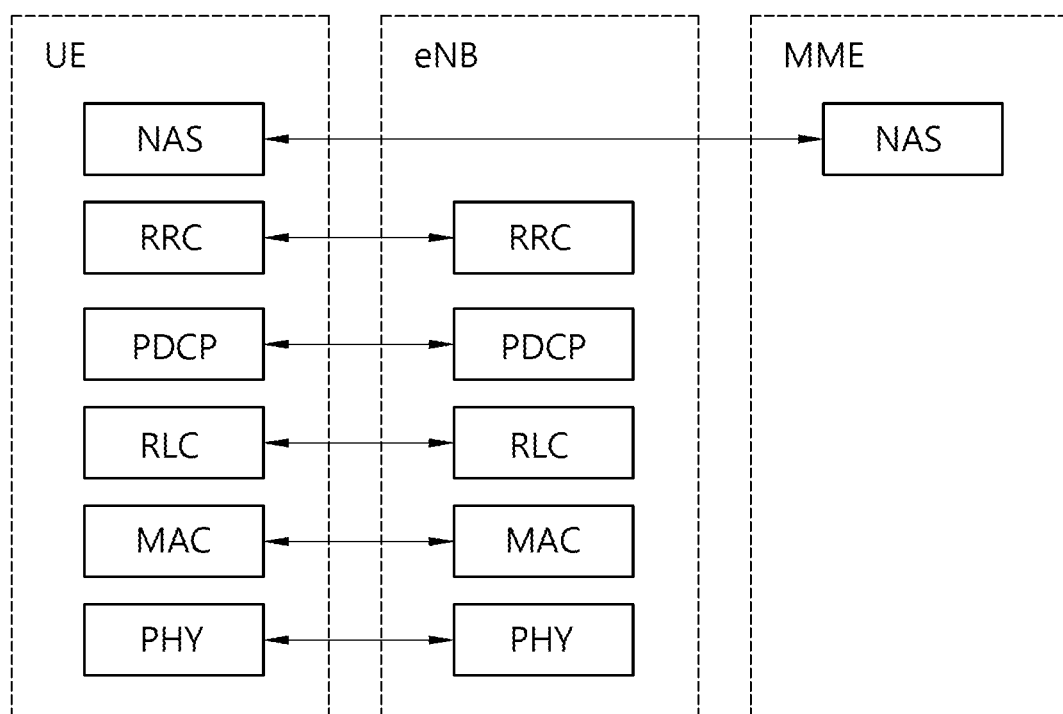
FIG. 2 shows a block diagram of a control plane protocol stack of an LTE system.
Figure 3:
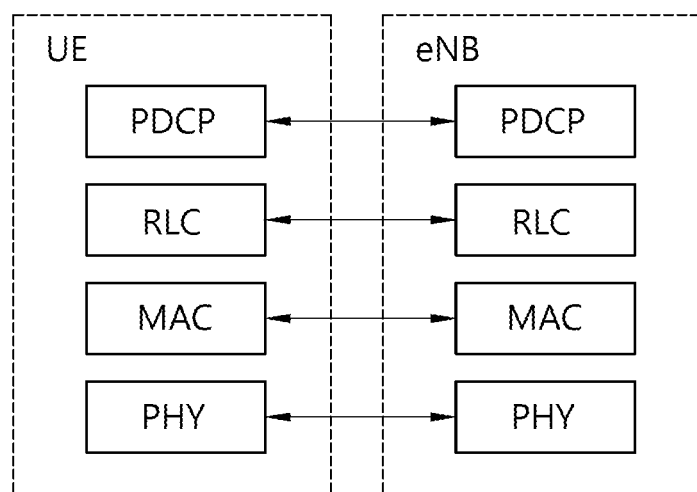
FIG. 3 shows a block diagram of a user plane protocol stack of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a method and procedure in which a UE selects a cell will be described.

A cell selection process is divided into two categories.

First, in an initial cell selection process, the UE does not have previous information about a radio channel. Therefore, in order to search for a suitable cell, the UE searches for all radio channels. The UE searches for a strongest cell in each channel. Thereafter, when the UE finds a suitable cell satisfying a cell selection criterion, the UE selects the corresponding cell.

Next, the UE may select a cell using stored information or using information broadcasting in the cell. Therefore, the UE may quickly select a cell, compared with the initial cell selection process. When the UE finds a cell satisfying a cell selection criterion, the UE selects the corresponding cell. When the UE does not find a suitable cell satisfying the cell selection criterion through this process, the UE performs an initial cell selection process.

After selecting any cell through the cell selection procedure, intensity or a quality of signals between the UE and the base station may be changed due to a change in mobility or a radio environment of the UE. Therefore, when a quality of the selected cell is deteriorated, the UE may select another cell providing a better quality. When the cell is again selected in this way, the UE selects a cell generally providing a better signal quality than that of the currently selected cell. This process is referred to as cell reselection. The cell reselection process has a basic object in selecting a cell providing a best quality to the UE in a quality aspect of a radio signal.

In addition to a quality aspect of a radio signal, the network may determine a priority for each frequency to notify the UE of the priority. The UE, having received such a priority considers the priority more preferentially than radio signal quality criteria in a cell reselection process.

As described above, there is a method of selecting or reselecting a cell according to signal characteristics of a radio environment, and in selecting a cell for reselection, there may be the following cell reselection methods according to RAT and frequency characteristic of the cell.

Intra-frequency cell reselection: the UE reselects a cell having the same RAT as that of a camping cell and the same center-frequency as that of a camping cell Inter-frequency cell reselection: the UE reselects a cell having the same RAT as that of a camping cell and a center-frequency different from that of a camping cell Inter-RAT cell reselection: the UE reselects a cell using RAT different from camping RAT A principle of a cell reselection process is as follows:

First, the UE measures a quality of a serving cell and a neighboring cell for cell reselection.

Second, cell reselection is performed based on cell reselection criteria. Cell reselection criteria have the following characteristics with respect to measurement of the serving cell and the neighboring cell.

Intra-frequency cell reselection is basically performed based on a ranking. The ranking is a work that defines an index value for cell reselection evaluation and that sequences cells in magnitude order of the index value using the index value. A cell having a best index is often referred to as a highest ranked cell. A cell index value is a value that applies a frequency offset or a cell offset, as needed based on a value in which a UE measures for the corresponding cell.

Inter-frequency cell reselection is performed based on a frequency priority provided by the network. The UE attempts to camp on in a frequency having a highest frequency priority. The network may provide a frequency priority to be commonly applied to UEs within a cell through broadcast signaling or may provide a priority for each frequency for each UE through dedicated signaling for each UE. A cell reselection priority provided through broadcast signaling may be referred to as a common priority, and a cell reselection priority set by a network for each UE may be referred to as a dedicated priority. When receiving the dedicated priority, the UE may together receive a validity time related to the dedicated priority. When receiving the dedicated priority, the UE starts a validity timer set to the together received validity time. While the validity timer operates, the UE applies a dedicated priority in an RRC idle mode. When the validity timer has expired, the UE discards a dedicated priority and again applies a common priority.

For inter-frequency cell reselection, the network may provide a parameter (e.g., frequency-specific offset) used for cell reselection for each frequency to the UE.

For intra-frequency cell reselection or inter-frequency cell reselection, the network may provide a neighboring cell list (NCL) to be used for cell reselection to the UE. The NCL includes a cell-specific parameter (e.g., cell-specific offset) to be used for cell reselection.

For intra-frequency or inter-frequency cell reselection, the network may provide a cell reselection black list to be used for cell reselection to the UE. For a cell included in the black list, the UE does not perform cell reselection.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle.

The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Hereinafter, a 5G network structure is described.

Figure 4:
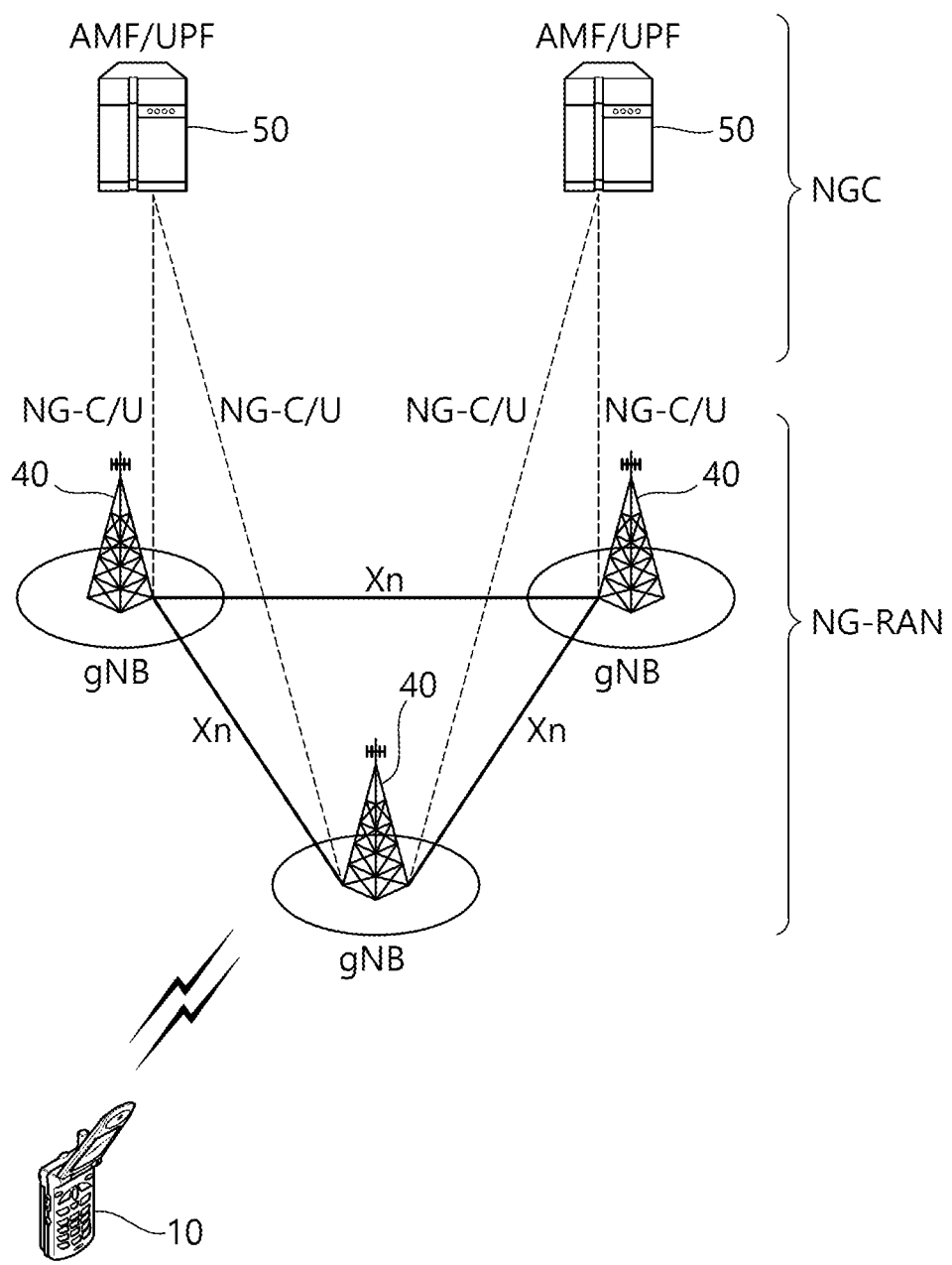
FIG. 4 shows the structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on the NR standardization, an RRC_INACTIVE state (RRC inactive state) has been newly introduced in addition to the existing RRC_CONNECTED state and RRC_IDLE state. The RRC_INACTIVE state may be a concept similar to a lightly connected mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

Multimedia broadcast multicast services (MBMS) are described.

Figure 5:
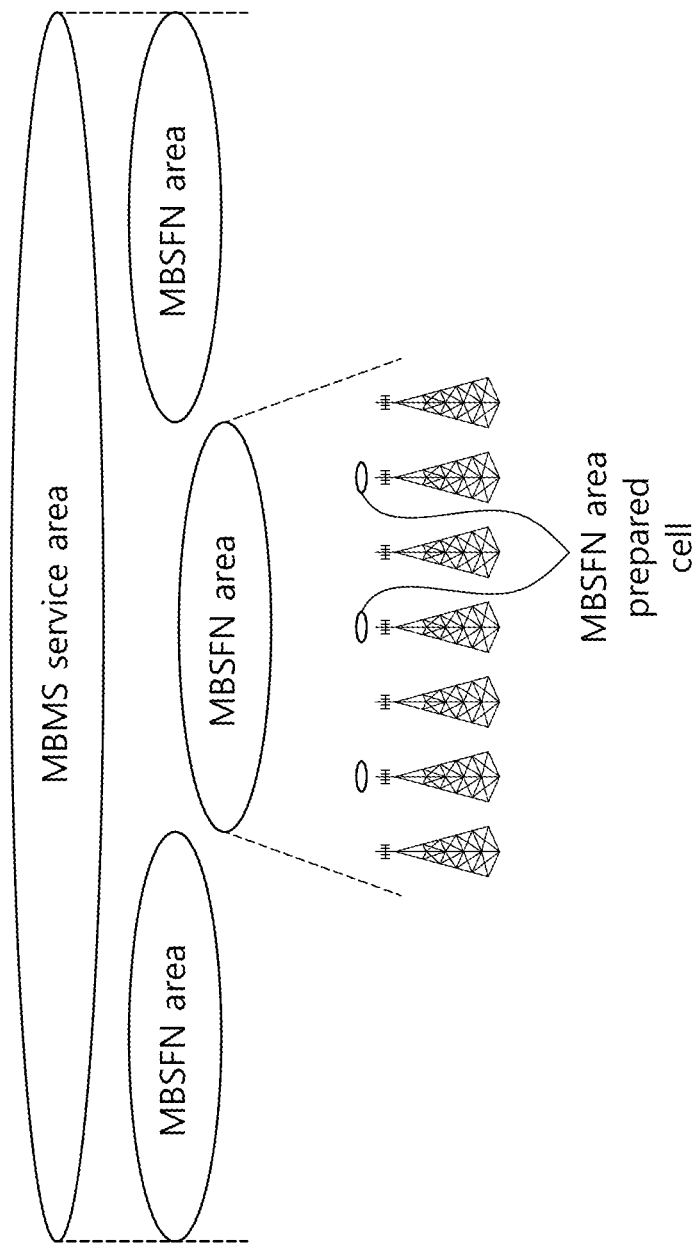
FIG. 5 shows the MBMS requirements.

FIG. 5 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

Transmission of a MBMS in E-UTRAN uses either MBSFN transmission or SC-PTM transmission. The MCE makes the decision on whether to use SC-PTM or MBSFN for each MBMS session.

The single-cell transmission of MBMS has the following characteristics.

The MBMS is transmitted in a single cell coverage;
One SC-MCCH and one or more SC-MTCH(s) are mapped on the DL-SCH;
Scheduling is performed by the eNB.
SC-MCCH and SC-MTCH transmissions are indicated by logical channel specific RNTIs on the PDCCH, respectively (there is a one-to-one mapping between the TMGI and the G-RNTI used to receive the DL-SCH to which the SC-MCCH is mapped);
A single transmission is used for the DL-SCH to which the SC-MCCH or the SC-MTCH is mapped (i.e. both blind HARQ repetition or RLC fast repetition);
SC-MCCH and SC-MTCH use RLC-UM mode.

For each SC-MTCH, the following scheduling information is provided on the SC-MCCH:
SC-MTCH scheduling cycle;
SC-MTCH duration: After waking up from DRX, it receives the PDCCHs, the duration of the downlink subframes the UE waits for. If the UE successfully decodes the PDCCH indicating the DL-SCH to which this SC-MTCH is mapped, the UE maintains the awake state and starts the inactivity timer.

SC-MTCH Inactivity Timer: The duration, DRX, in the downlink sub-frame waiting for the UE to successfully decode the PDCCH from the last successful decoding of the PDCCH indicating the DL-SCH to which this SC-MTCH is mapped. The UE should restart the inactivity timer following a successful decoding of the PDCCH.

On the other hand, the SC-PTM reception opportunity is independent of the unicast DRX system. In addition, the SC-MTCH inactivity timer may be set to zero. Also, while the above parameters are SC-MTCH (i.e., per MBMS service), the network may configure the same scheduling pattern for multiple SC-MTCHs (i.e., multiple MBMS services).

Multi-cell transmission of MBMS has the following characteristics:

MBMS synchronous transmission in MBSFN area;
Combination of MBMS transmissions from multiple cells is supported.
Scheduling of each MCH is performed by the MCE.
Single transmission is not used for MCH (i.e., both blind HARQ repetition or RLC fast repetition);
A single transport block is used per TTI for MCH transmission, and TB uses all MBSFN resources in that subframe.
The MTCH and MCCH may be multiplexed on the same MCH and mapped on the MCH for p-t-m transmission.
MTCH and MCCH use RLC-UM mode.
The MAC subheader displays the LCID for MTCH and MCCH.
The MBSFN synchronization area, MBSFN area and MBSFN cell are configured semi-statically, for example, by O&M.
The MBSFN area is static unless it is changed to O&M (no dynamic area change).
The UE does not need to receive service from more than one MBSFN Area at the same time and can only support a limited number of MTCHs.

Hereinafter, single-cell point-to-multipoint (SC-PTM) transmission will be described.

The MBMS transmission method includes SCPTM transmission and Multimedia Broadcast multicast service Single Frequency Network (MBSFN) transmission. The MBSFN transmission transmits signals identifiable simultaneously in a plurality of cells, while the SCPTM transmission transmits MBMS services in a single cell. Therefore, SCPTM transmission does not require synchronization between cells unlike MBSFN transmission. Also, unlike MBSFN transmission, SCPTM transmission uses unchanged PDSCH as it is. That is, a plurality of UEs read the same PDCCH, obtain an RNTI for each service, and receive an SCPTM service. When the MCCH dedicated to SCPTM is introduced and the UE determines that the desired service is an SCPTM service through the MCCH, the UE can receive the SCPTM service by acquiring the corresponding RNTI value and reading the PDCCH through the RNTI.

An MBMS interest indication is described. The purpose of this procedure is to notify the E-UTRAN that the UE is interested or is in the process of receiving an MBMS over the MBMS radio bearer (MRB) and informs the E-UTRAN of the priority of the MBMS for unicast reception.

Figure 6:
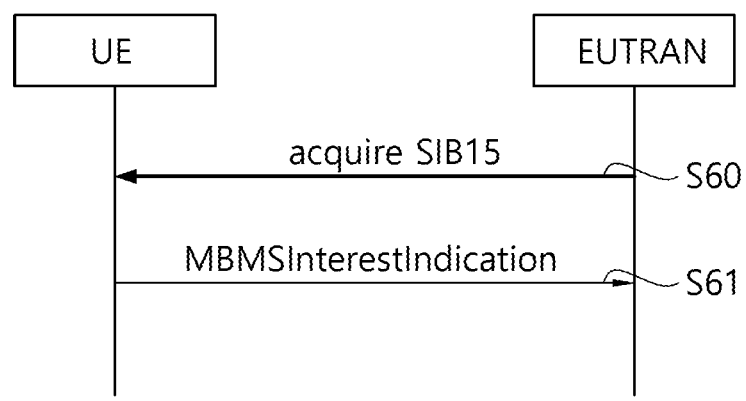
FIG. 6 shows an MBMS interest direction procedure.

FIG. 6 shows an MBMS interest indication procedure. An MBMS capable UE in RRC_CONNECTED may initiate the procedure in several cases including upon successful connection establishment, upon entering or leaving the service area, upon session start or stop, upon change of interest, upon change of priority between MBMS reception and unicast reception or upon change to a primary cell (PCell) broadcasting SystemInformationBlockType15.

Upon initiating the procedure, the UE shall:
1> if SystemInformationBlockType15 is broadcast by the PCell in step S60:
2> ensure having a valid version of SystemInformationBlockType15 for the PCell;
2> if the UE did not transmit an MBMSInterestIndication message since last entering RRC_CONNECTED; or
2> if since the last time the UE transmitted an MBMSInterestIndication message, the UE connected to a PCell not broadcasting SystemInformationBlockType15:
3> if the set of MBMS frequencies of interest is not empty:
4> initiate transmission of the MBMSInterestIndication message;
2> else:
3> if the set of MBMS frequencies of interest has changed since the last transmission of the MBMSInterestIndication message; or
3> if the prioritization of reception of all indicated MBMS frequencies compared to reception of any of the established unicast bearers has changed since the last transmission of the MBMSInterestIndication message:
4> initiate transmission of the MBMSInterestIndication message.

The UE may send an MBMSInterestIndication even when it is able to receive the MBMS services it is interested in i.e. to avoid that the network allocates a configuration inhibiting MBMS reception.

To determine MBMS frequencies of interest, the UE shall:
1> consider a frequency to be part of the MBMS frequencies of interest if the following conditions are met:
2> at least one MBMS session the UE is receiving or interested to receive via an MRB is ongoing or about to start (the UE may determine whether the session is ongoing from the start and stop time indicated in the user service description (USD)); and
2> for at least one of these MBMS sessions SystemInformationBlockType15 acquired from the PCell includes for the concerned frequency one or more MBMS service area identifiers (SAIs) as indicated in the USD for this session (the UE considers a frequency to be part of the MBMS frequencies of interest even though the E-UTRAN may (temporarily) not employ an MRB for the concerned session. i.e., the UE does not verify if the session is indicated on MCCH); and
2> the UE is capable of simultaneously receiving the set of MBMS frequencies of interest, regardless of whether a serving cell is configured on each of these frequencies or not; and
2> the supportedBandCombination the UE included in UE-EUTRA-Capability contains at least one band combination including the set of MBMS frequencies of interest.

In addition, in order to determine MBMS services of interest, the UE operates as follows:
1> MBMS service is considered to be a part of the MBMS service of interest if the following conditions are satisfied.
2> SC-PTM is possible in the UE;
2) the UE is interested in receiving or is receiving the service through the SC-MRB;
2> One session of this service is in progress or is about to begin 2> One or more MBMS SAIs in USD for this service are included in SystemInformationBlockType15 obtained from PCell for frequencies belonging to the MBMS frequency set of interest Indicating a frequency implies that the UE supports SystemInformationBlockType13 acquisition for the concerned frequency, i.e., the indication should be independent of whether a serving cell is configured on that frequency. When evaluating which frequencies it can receive simultaneously, the UE does not take into account the serving frequencies that are currently configured, i.e., it only considers MBMS frequencies it is interested to receive. The term frequency does not indicate a physical frequency but covers the associated band(s), noting that additional bands may be indicated in SystemInformationBlockType1 (serving frequency) or SystemInformationBlockType15 (neighboring frequencies).

The UE shall set the contents of the MBMSInterestIndication message as follows:
1> if the set of MBMS frequencies of interest is not empty:
2> include mbms-FreqList and set it to include the MBMS frequencies of interest, using the E-UTRA absolute radio frequency channel number (EARFCN) corresponding with freqBandIndicator included in SystemInformationBlockType1, if applicable, and the EARFCN(s) as included in SystemInformationBlockType15. The mbms-FreqList merely indicates the physical frequencies the UE is interested to receive and does not imply the UE supports the associated band.
2> include mbms-Priority if the UE prioritizes reception of all indicated MBMS frequencies above reception of any of the unicast bearers. If the UE prioritizes MBMS reception and unicast data cannot be supported because of congestion on the MBMS carrier(s), the E-UTRAN may initiate release of unicast bearers. It is up to E-UTRAN implementation whether all bearers or only GBR bearers are released. The E-UTRAN does not initiate re-establishment of the released unicast bearers upon alleviation of the congestion.

The UE shall submit the MBMSInterestIndication message to lower layers for transmission. Accordingly, in step S91, the UE transmits the MBMSInterestIndication message to the E-UTRAN.

Figure 7:
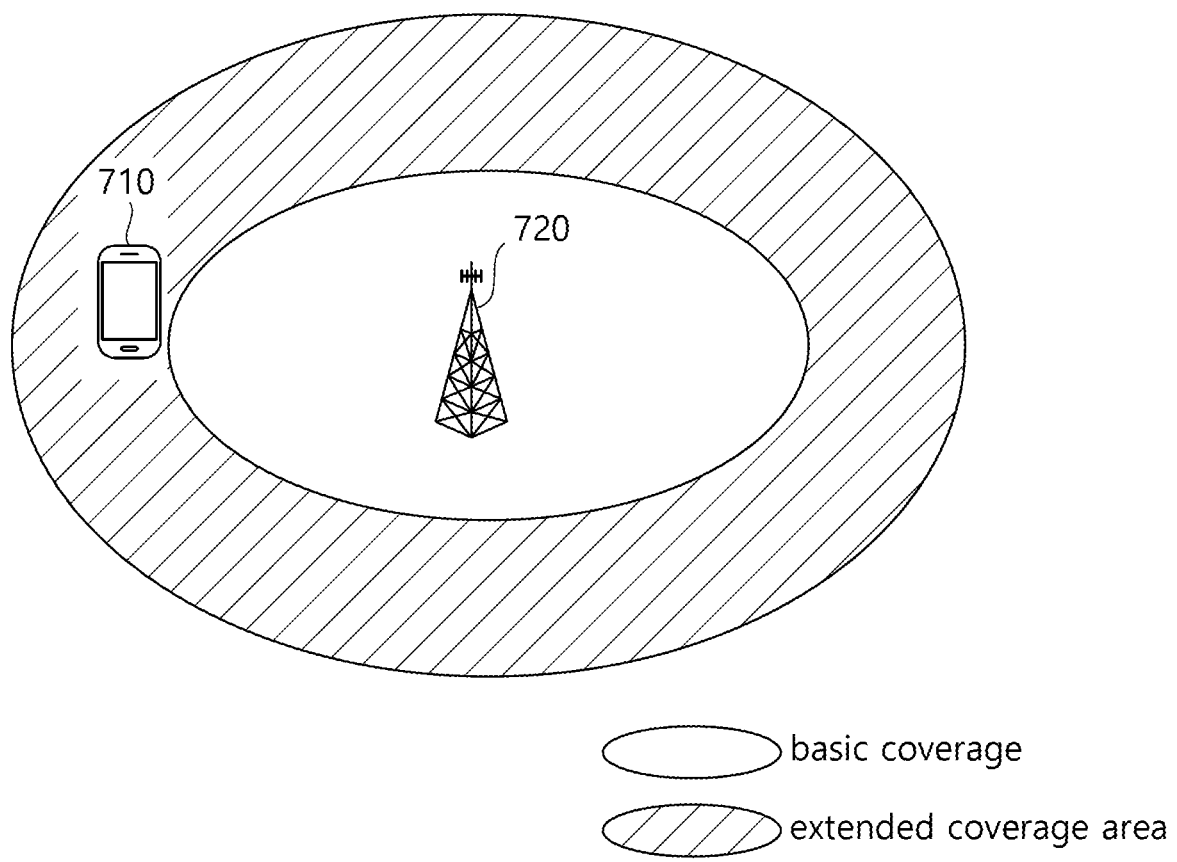
FIG. 7 shows an example of cell coverage enhancement.
Figure 8:
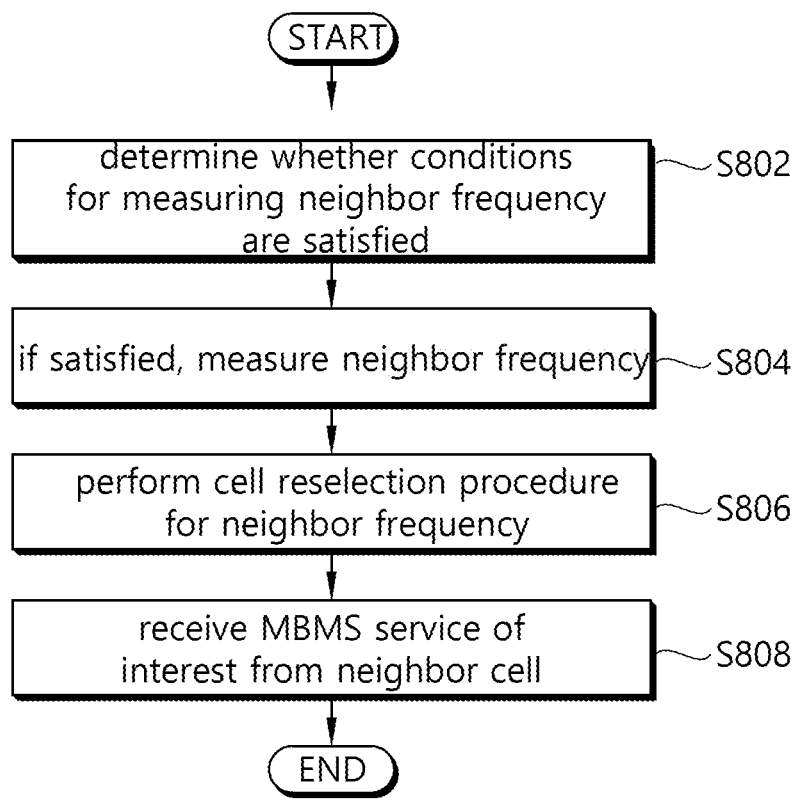
FIG. 8 is a flowchart illustrating a cell reselection procedure according to an embodiment of the present invention.

FIG. 7 shows an example of cell coverage enhancement.

Recently, various coverage enhancement techniques, such as a repeated transmission method for a UE 710 per channel/signal, have been discussed. A coverage enhancement level (hereinafter, "CE level") may change depending on the location of a UE in a cell and the signal quality of the UE in the cell. A different CE level refers to a different number of repetitions (resources or subframes) required for successful uplink transmission and downlink reception. For a UE, it is advantageous in view of power consumption to stay in a cell requiring a smaller number of repetitions for successful uplink transmission and downlink reception. A smaller number of repetitions for successful uplink transmission and downlink reception may be needed particularly for an MTC UE. The MTC UE refers to a wireless device that provides MTC communication, and MTC communication refers to an information exchange between MTC UEs via a BS, which does not involve human interaction or an information exchange between an MTC UE and an MTC server through a BS. For a network, it is also advantageous to serve a UE that requires a smaller number of repetitions.

On the other hand, recently, Internet of Things (IoT) communication has attracted attention. IoT refers to communications that do not involve human interaction. The issue about accommodating such IoT communications in a cellular-based LTE system is started to be discussed. However, since the existing LTE system has been designed for the purpose of supporting high-speed data communication, it has been regarded as an expensive communication method.

However, IoT communication can be widely used when it is cheap because of its characteristics. IoT devices were able to reduce costs by simplifying operation by eliminating many functions supported by LTE systems. In the following description, IoT devices operating in reduced bandwidth according to low-complexity/low-capability/low-specification/low-cost is referred to as an NB-IoT UE.

A UE or an NB-IoT UE existing in an extended coverage (EC) does not have frequency priority information for performing cell reselection. That is, the UE or the NB-IoT UE existing in the extended coverage cannot perform the cell re-selection process based on the priority. Such a UE does not perform inter/intra-frequency measurements when the serving cell quality is above a threshold value, and thus cannot reselect an SC-PTM cell on inter/intra-frequency.

Therefore, even if the serving cell quality is equal to or higher than the threshold value, the NB-IoT UE or the UE within the extended coverage needs to perform inter/intra-frequency measurement on neighboring frequencies which provide the interested MBMS service through MBSFN transmission or SC-PTM transmission if it is interested in receiving the MBMS service.

Hereinafter, a cell reselection method according to an embodiment of the present invention will be described. A UE according to an embodiment of the present invention is a UE existing in an NB-IoT UE or an extended coverage (EC), and can perform inter/intra-frequency measurement for the neighboring frequencies providing the MBMS service of interest through MBSFN transmission or SC-PTM transmission regardless of the quality of the serving cell.

In step S802, the UE can determine whether or not the condition for the next neighbor cell measurement is satisfied.

Condition 1: The UE supports MBMS service continuity or SC-PTM reception and/or

Condition 2: The UE is interested in receiving the MBMS service through MBSFN transmission or SC-PTM transmission and/or Condition 3: The MBMS service of interest is being provided on the inter/intra frequency from the neighboring cell and/or Condition 4: The UE is an NB-IoT UE and/or Condition 5: The UE is in extended coverage and/or Condition 6: The UE shall have a higher priority Inter/Intra frequency than the current E-UTRA frequency.

In step S804, if the above conditions are satisfied, the UE can perform the inter/intra-frequency measurement even though the quality of the serving cell is equal to or higher than the threshold value. On the other hand, if the quality of the serving cell is greater than or equal to the threshold value and the above conditions are not satisfied, the UE does not perform the inter/intra-frequency measurement. The threshold may be set differently depending on whether it is an inter-frequency measurement or an intra-frequency measurement. The quality of the serving cell is higher than the threshold value, which means that the quality of the serving cell is good enough that it is not necessary to perform cell reselection to the neighboring cell in the existing cell reselection procedure.

Specifically, if the UE is interested in receiving an MBMS service and knows the neighboring cell from which the MBMS service is provided through MBMSFN transmission or SC-PTM transmission, the UE can perform measurement for the neighboring cell even though the quality of the serving cell is equal to or greater than the threshold value.

On the other hand, if the above conditions are satisfied, the inter/intra-frequency to be measured may be limited to the inter/intra frequency that provides the MBMS service of interest. Specifically, if the MBMS service of interest is provided on frequency B by cell A through an SC-PTM transmission and the conditions described above are satisfied, the UE can only measure for frequency B, even though the quality of the serving cell is equal to or greater than the threshold value.

In addition, the inter/intra-frequency to be measured when the above-described condition is satisfied can be limited to the inter/intra frequency having the priority higher than or equal to the current E-UTRA frequency. Specifically, if the UE considers that the frequency B is the highest priority, if the above conditions are satisfied, the UE can perform the frequency measurement only for the frequency B, even though the quality of the serving cell is greater than or equal to the threshold value. That is, the UE does not perform cell reselection based on the frequency priority, but may not reselect a cell having a low priority.

The inter/intra-frequency to be measured in the case where the above-described conditions are satisfied may be limited to the inter/intra frequency listed in the system information block 15 or the inter/intra frequency listed in the SC-MCCH (SC-PTM setting message).

In step S806, the UE can reselect the neighboring cell providing the MBMS service of interest through the cell reselection procedure.

In step S808, the UE can receive the MBMS service of interest through MBSFN transmission or SC-PTM transmission.

Figure 9:
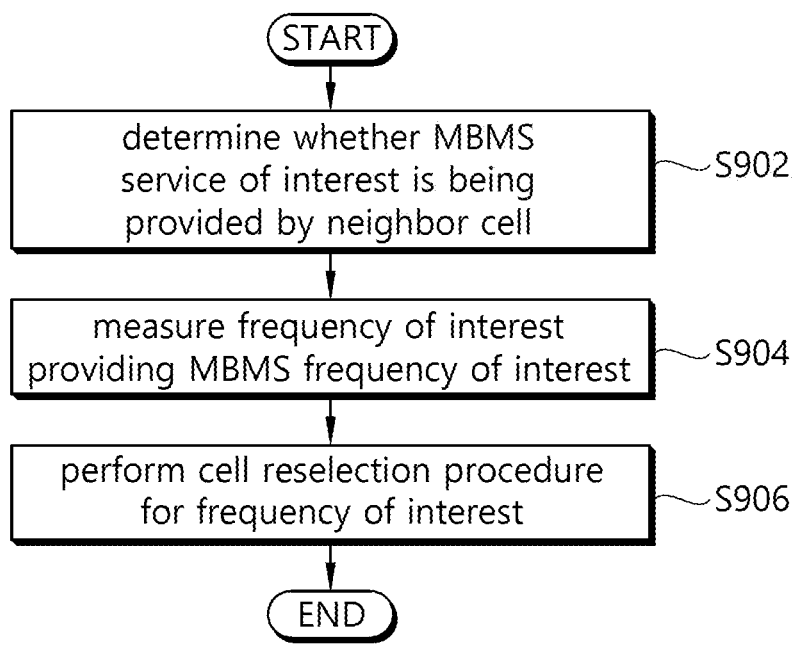
FIG. 9 is a flowchart illustrating a cell reselection procedure according to an embodiment of the present invention.

FIG. 9 is a flowchart illustrating a method for performing a cell reselection procedure according to an embodiment of the present invention. In this embodiment, the UE does not support the cell reselection procedure based on the frequency priority, and may be the NB-IoT UE or the UE existing in the extended coverage. Further, in this embodiment, the serving cell may have a quality higher than the set threshold value.

In step S902, the UE can determine, on the serving cell, whether a MBMS service of interest is being provided from a neighbor cell. Information about neighbor cells may be received via system information block 15 (SIB 15). In addition, information on neighboring cells may be received via a single-cell multicast control channel (SC-MCCH).

In step S904, if it is determined that the interested MBMS service is provided from the neighboring cell, the UE can measure the quality of a frequency of interest for which the interested MBMS service is provided. Also, the frequency of interest may be an intra-frequency having the same center frequency as that of the cell where the UE stays, or an inter-frequency having a center frequency different from the cell where the UE stays.

In step S906, the UE may perform a cell reselection procedure on the neighbor cell based on the measured quality.

The UE may then receive the MBMS service of interest via SC-PTM transmission or MBSFN transmission from the frequency of interest.

Figure 10:
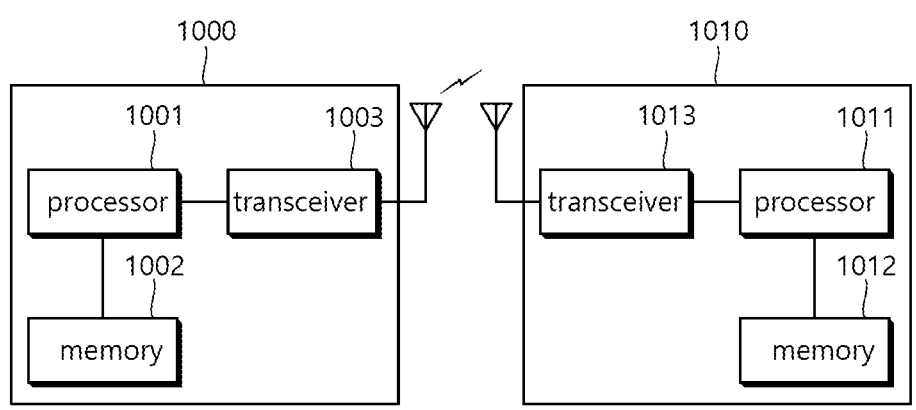
FIG. 10 is a block diagram of a wireless communication system in which an embodiment of the present invention is implemented.

FIG. 10 is a block diagram illustrating a wireless apparatus in which an embodiment of the present invention can be implemented.

A BS 1000 includes a processor 1001, a memory 1002, and a radio frequency (RF) unit 1003. The memory 1002 is coupled to the processor 1001, and stores a variety of information for driving the processor 1001. The RF unit 1003 is coupled to the processor 1001, and transmits and/or receives a radio signal. The processor 1001 implements the proposed functions, procedures, and/or methods. In the aforementioned embodiments, an operation of the BS may be implemented by the processor 1001.

A UE 1010 includes a processor 1011, a memory 1012, and an RF unit 1013. The memory 1012 is coupled to the processor 1011, and stores a variety of information for driving the processor 1011. The RF unit 1013 is coupled to the processor 1011, and transmits and/or receives a radio signal. The processor 61 implements the proposed functions, procedures, and/or methods. In the aforementioned embodiments, an operation of the UE 1010 may be implemented by the processor 1011.

The processors 1011 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a wireless device in a wireless communication system, the method comprising:
   measuring a quality of a serving cell to obtain a serving cell quality;
   performing a frequency measurement on a frequency on which a multimedia broadcast multicast service (MBMS) service of interest is provided, based on the serving cell quality being equal to or greater than a threshold value;
   performing a cell reselection to a neighbor cell on the frequency based on a result of the frequency measurement; and
   receiving the MBMS service of interest from the neighbor cell.

2. The method of claim 1, wherein the wireless device is a narrowband-internet of things (NB-IoT) terminal or a terminal in an extended coverage (EC).

3. The method of claim 1, wherein the frequency on which the MBMS service of interest is provided comprises at least one of:
   an intra-frequency having a central frequency that is equal to a central frequency of a serving frequency on which the serving cell exists; or
   an inter-frequency having a central frequency that is different from the central frequency of the serving frequency.

4. The method of claim 1, further comprising:
   receiving information on the neighboring cell from which the MBMS service of interest is received through a system information block 15 (SIB 15).

5. The method of claim 1, further comprising:
   receiving information on the neighboring cell from which the MBMS service of interest is received through a single-cell multicast control channel (SC-MCCH).

6. The method of claim 1, wherein the MBMS service of interest is received through a single cell point to multi point (SC-PTM) transmission or a multicast broadcast single frequency network (MBSFN) transmission.

7. The method of claim 1, wherein the frequency measurement on the frequency on which the MBMS service is provided is performed while the serving cell quality is equal to or greater than the threshold value, based on the wireless device being interested in receiving the MBMS service.

8. The method of claim 1, wherein, based on the wireless device not being interested in receiving the MBMS service, a frequency measurement on one or more frequencies is not performed while the serving cell quality is equal to or greater than the threshold value and is performed while the serving cell quality is lower than the threshold value.

9. A wireless device configured to operate in a wireless communication system, the wireless device comprising:
   a memory;
   a transceiver; and
   at least one processor operatively coupled to the memory and the transceiver,
   wherein the at least one processor is configured to:
   measure a quality of a serving cell to obtain a serving cell quality,
   perform a frequency measurement on a frequency on which a multimedia broadcast multicast service (MBMS) service of interest is provided based on the serving cell quality being equal to or greater than a threshold value,
   perform a cell reselection to a neighbor cell on the frequency based on a result of the frequency measurement, and
   control the transceiver to receive the MBMS service of interest from the neighbor cell.

10. The wireless device of claim 9, wherein the wireless device is a narrowband-internet of things (NB-IoT) terminal or a terminal in an extended coverage (EC).

11. The wireless device of claim 9, wherein the frequency on which the MBMS service of interest is provided comprises at least one of:

an intra-frequency having a central frequency that is equal to a central frequency of a serving frequency on which the serving cell exists; or an inter-frequency having a central frequency that is different from the central frequency of the serving frequency.

12. The wireless device of claim 9, wherein the at least one processor is further configured to control the transceiver to receive information on the neighboring cell from which the MBMS service of interest is received through a system information block 15 (SIB 15).

13. The wireless device of claim 9, wherein the at least one processor is further configured to control the transceiver to receive information on the neighboring cell from which the MBMS service of interest is received through a single-cell multicast control channel (SC-MCCH).

14. The wireless device of claim 9, wherein the MBMS service of interest is received through a single cell point to multi point (SC-PTM) transmission or a multicast broadcast single frequency network (MBSFN) transmission.

15. The wireless device of claim 9, wherein the frequency measurement on the frequency on which the MBMS service is provided is performed while the serving cell quality is equal to or greater than the threshold value based on the wireless device being interested in receiving the MBMS service.

16. The wireless device of claim 9, wherein, based on the wireless device not being interested in receiving the MBMS service, a frequency measurement on one or more frequencies is not performed while the serving cell quality is equal to or greater than the threshold value and is performed while the serving cell quality is lower than the threshold value.

* * * * *